BEST AVAILABLE COPY

BEST AVAILABLE COPY

H. A. Parkhurst.

Mower.

No. 3537 Reissued Jul 6, 1869

Witnesses:

J. Snowden Bell

Joe S. Peyton

Inventor:

Cyrus H. McCormick by his Atty

W. D. Belamm

H. A. Parkhurst.

Mower.

No. 3537 Reissued Jul. 6, 1869

Witnesses:

Inventor
by his Atty
W. D. Bolamin

UNITED STATES PATENT OFFICE.

C. H. McCORMICK, OF CHICAGO, ILLINOIS, ASSIGNEE, BY MESNE ASSIGNMENTS, OF HAMILTON A. PARKHURST.

IMPROVEMENT IN HARVESTERS.

Specification forming part of Letters Patent No. 19,442, dated February 23, 1858; Reissue No. 3,537, dated July 6, 1869.

*To all whom it may concern:*

Be it known that HAMILTON A. PARKHURST, of Fairfield, in the county of Herkimer and State of New York, invented certain new and useful Improvements in Harvesting-Machines, of which the following is a full, clear, and exact description.

The invention herein claimed relates to that class of two-wheeled harvesters in which a laterally-projecting cutting apparatus is suspended, by one end only, from a main frame by means of hinged connections, which permit the finger-beam to rise and fall to conform to the undulations of the surface over which it slides; and the improvements herein claimed consist—

First. In a novel method of combining a main frame supported on wheels turning on independent axles oscillating around a center coincident with that of one of the shafts, which drives the cutters with a laterally-projecting short finger-beam hinged to the main frame above the plane of the cutters to conform to undulations of the surface over which it is drawn, by which mode of construction the working of the gearing and cutting apparatus always remains unimpeded.

Second. In a novel method of combining a main frame adjustable around a center coincident with that of a shaft parallel with but independent of the axles, with a short laterally-projecting finger-beam hinged to said frame by joints both in front and rear of the wheels and above the plane of the cutters.

Third. In a novel method of combining a main frame movable around a center coincident with that of a shaft in front of the axles of the bearing-wheels, with a short laterally-projecting finger-beam connected with the main frame by a coupling-frame inclosing the inner wheel.

Fourth. In a novel method of combining a main frame supported on wheels mounted on radius-bars, vibrating around a center coincident with that of a shaft parallel with but independent of said axles, with a bracing-frame connecting said radius-bars above the frame, whereby the radius-bars are rigidly braced and the frame kept horizontal.

Fifth. In a novel method of combining the radius-bars with quadrant-racks mounted on a rock-shaft operated by a single lever near the driver's seat to raise and lower both sides of the frame simultaneously.

Figure 1:
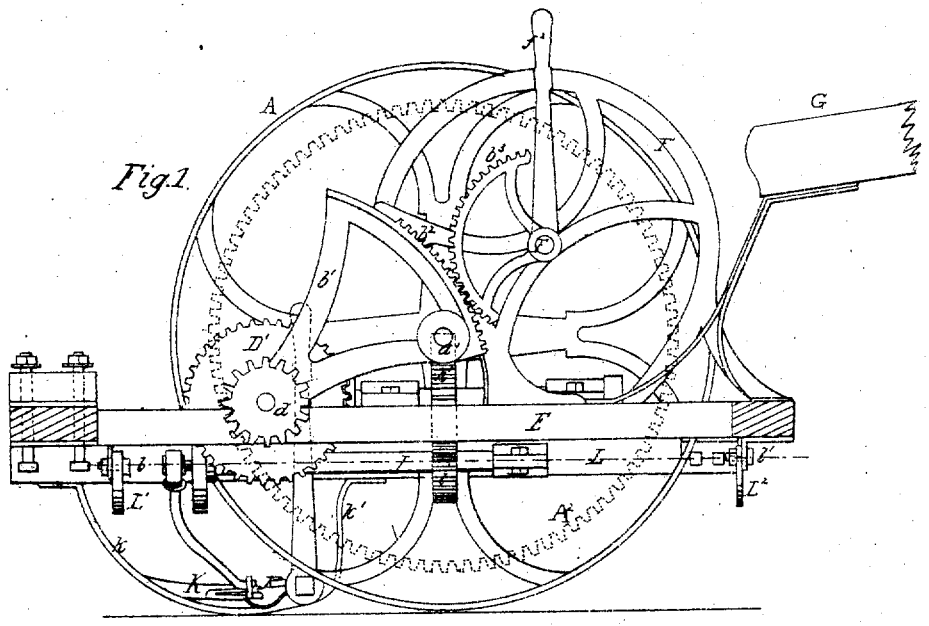
Figure 2:
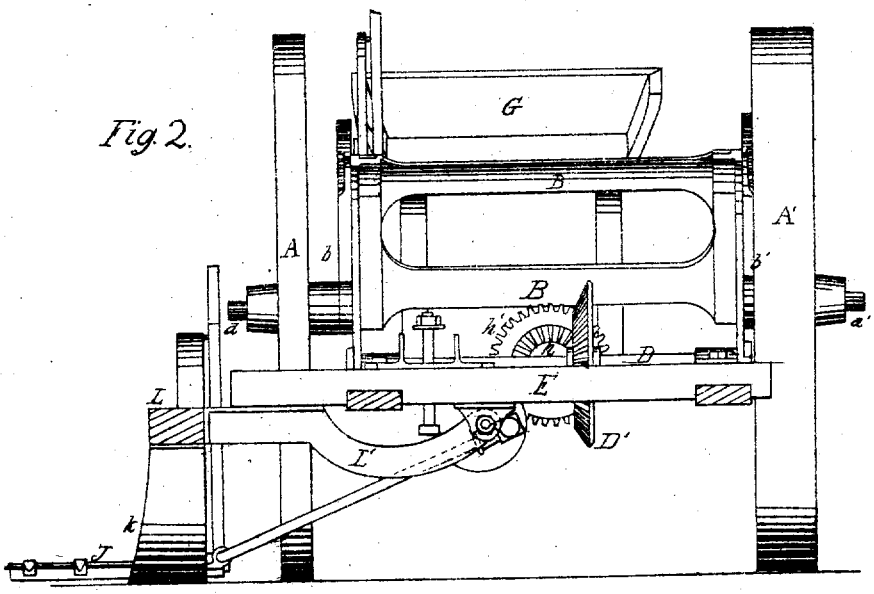
Figure 3:
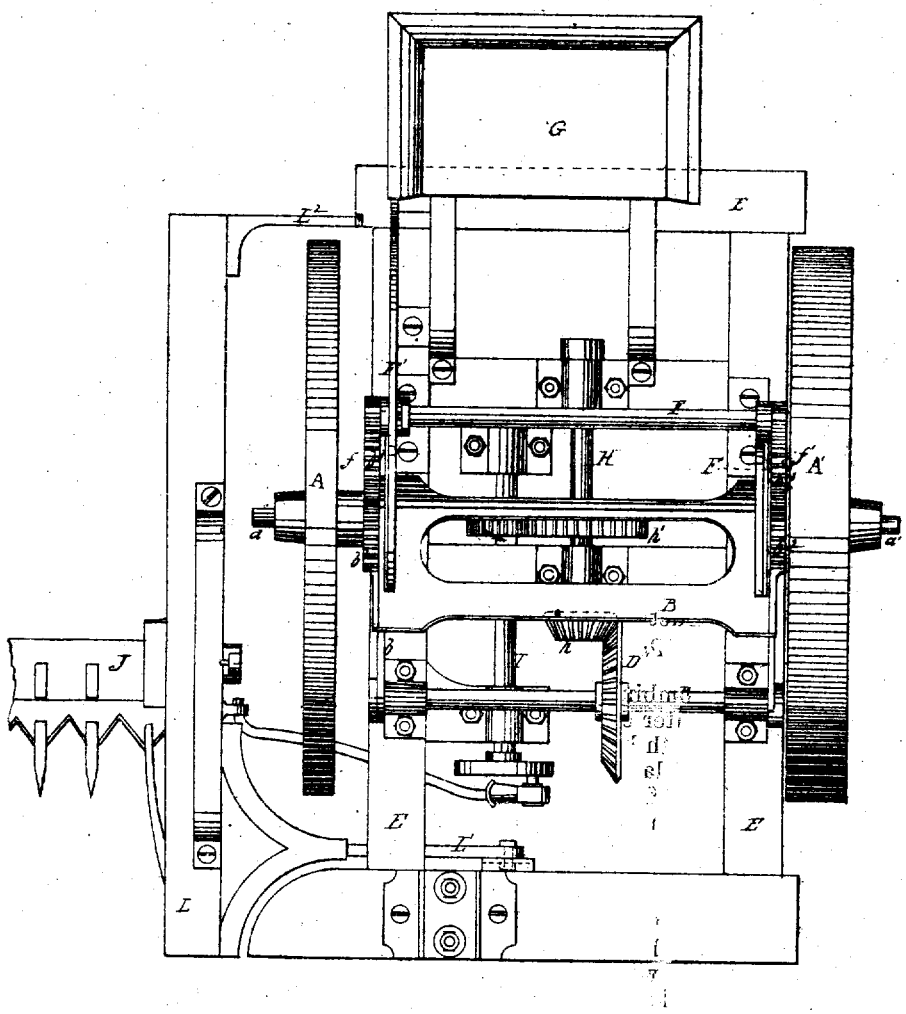

In the accompanying drawings, which show all of said PARKHURST'S improvements as embodied in one machine, Figure 1 represents a view in elevation of the improved harvester, as seen from the stubble side thereof, with the outer wheel removed. Fig. 2 represents a similar view of the same, as seen from the front, with both wheels in place; and Fig. 3 represents a plan or top view of the same.

Two main bearing-wheels, A A′, turn freely on stud-axles *a a′* mounted on radius-bars or sector-plates *b b′* connected by a frame, B, spanning the main frame, and oscillating around a shaft, D, turning in suitable bearings on the main frame E. Teeth $b^2$ on the sectors *b b′* gear into corresponding teeth $b^3$ on quadrant-racks *f f′*, fixed upon and turning with a rock-shaft, F, mounted on a frame, F′, and controlled by a hand-lever, $f^2$, operated by the driver from his seat G. The lever is held in any desired position by pins in the frame F′ on the rear of the main frame. The front side of the frame F′ is concave, and fits the curved surface of the frame B on which it slides, thus always affording a firm support.

By this mode of construction it will be observed the main frame can be raised or lowered on the axles *a*. In order that the raising and lowering of this frame may not impede the working of the gearing, the axis around which the main frame moves is made coincident with the center of rotation of the shaft which drives the gearing. In this instance, in order to diminish the side draft, the outer wheel, A′, only drives. An internally-geared spur-wheel, $A^2$, shown in red in Fig. 2, on this wheel drives a corresponding pinion, *d*, on the counter-shaft D on which the base of the sectors *b b′* are pivoted. A bevel-wheel, D′, on this shaft drives a corresponding pinion, *h*, on a secondary shaft, H, crossing the line of the axles of the main wheels, and carrying a spur-wheel, *h′*, driving a corresponding pinion, *i*, on a crank-shaft, I, parallel to the shaft H and crossing both the main axles and counter-shaft, but at a lower level, to bring the crank closer to the ground. The cutters are driven by a crank and pitman in the usual way.

A short finger-beam, J, (that is one no longer than the cutters,) is secured to a shoe, K, connected by front and rear arms, *k k'*, with a beam, L, parallel with the face of the inner wheel. Arms L' L² secured to this beam in front and rear are pivoted to the main frame by joints *l l'*, in line or nearly in line with the crank-shaft, as shown by the red line in Fig. 1, by which means the cutting apparatus can play up and down without disturbing the relations of the guards and cutters.

What is claimed herein as the invention of the said Parkhurst is—

1. The combination of a main frame supported on wheels mounted on independent axles which oscillate around a center coincident with that of one of the shafts which drives the cutters, substantially as set forth, with a laterally-projecting short finger-beam hinged to the main frame at one end only and above the plane of the cutters.

2. The combination of a main frame adjustable on a center coincident with that of a shaft parallel with but independent of the driving-wheel axles, substantially as set forth, with a laterally-projecting short finger-beam hinged to said frame by joints both in front and rear of the wheels and above the plane of the cutters.

3. The combination of a main frame movable around a center coincident with that of a shaft in front of the axis of the wheels, substantially as set forth, with a laterally-projecting short finger-beam connected with the main frame by a coupling-frame inclosing the inner wheel.

4. The combination of the main frame radius-bars and their connecting-frame, substantially as set forth.

5. The combination of the radius-bars, quadrant-racks, rock-shaft, and lifting-levers, with the driver's seat, substantially as set forth.

C. H. McCORMICK.

Witnesses:
T. B. WAKEMAN,
J. B. ROE.